(12) United States Patent
Maruyama

(10) Patent No.: US 7,582,275 B1
(45) Date of Patent: Sep. 1, 2009

(54) METHOD OF PROCESSING FILAMENTARY NANOCARBON

(75) Inventor: Benji Maruyama, Yellow Springs, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 715 days.

(21) Appl. No.: 10/767,498

(22) Filed: Jan. 26, 2004

(51) Int. Cl.
*C09C 1/56* (2006.01)
(52) U.S. Cl. .............................. 423/460; 423/DIG. 11
(58) Field of Classification Search ................. 423/460, 423/DIG. 11
See application file for complete search history.

(56) References Cited

U.S. PATENT DOCUMENTS 5,853,877 A   12/1998   Shibuta
6,113,795 A   9/2000   Subramaniam et al.
6,177,103 B1   1/2001   Pace et al.
2003/0086859 A1   5/2003   Kawakami et al.

*Primary Examiner*—Edward M Johnson
(74) *Attorney, Agent, or Firm*—AFMCLO/JAZ; Richard A. Lambert; Christopher J. Menke

(57) ABSTRACT

The method of the present invention utilizes high pressure, near-supercritical $CO_2$ within a pressure vessel to process filamentary nanocarbon to debulk, disperse, purify, surface treat, pre-impregnate, and micronize the carbon nanofibers. In accordance with the invention, near-supercritical $CO_2$ is utilized within a pressure vessel to effect the desired process upon filamentary nanocarbon. For example, a quantity of filamentary nanocarbon can be effectively debulked, de-agglomerated and disentangled by agitating the mixture within the pressure vessel. When the $CO_2$ is released from the pressure vessel, the filamentary nanocarbon exhibits a dramatic reduction in volume. Other nanofiber processes can be performed such as surface treating and pre-impregnation by introduction of the desirable species into the near-supercritical $CO_2$ prior to processing. Purification processing can additionally be performed by introducing a co-solvent into the near-supercritical $CO_2$.

14 Claims, 1 Drawing Sheet

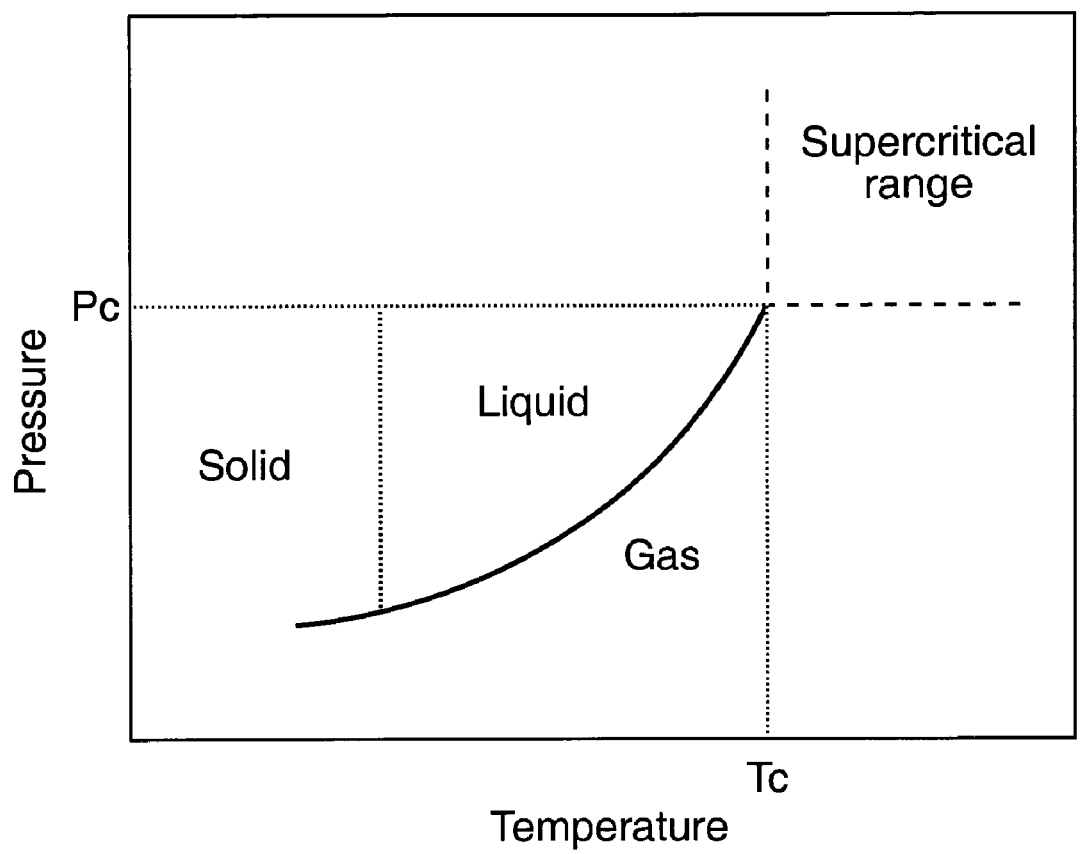

METHOD OF PROCESSING FILAMENTARY NANOCARBON

RIGHTS OF THE GOVERNMENT

The invention described herein may be manufactured and used by or for the Government of the United States for all governmental purposes without the payment of any royalty.

BACKGROUND OF THE INVENTION

The present invention relates generally to carbon nanofibers and nanotubes, and more specifically to a post-manufacture processing method for debulking, dispersing, purifying, surface treating, pre-impregnating, and micronizing filamentary nanocarbon.

The term filamentary nanocarbon is meant to encompass carbon nanotubes, both single and multiwall, as well as carbon nanofibers. Filamentary nanocarbon is a recently developed material having great commercial utility and promise for providing structural support or reinforcement, electrical and thermal conductivity and for use in electronic devices including transistors and solar cells. Other uses of filamentary nanocarbon include composites, filled polymers, electron emitters and flat panel displays.

The filamentary nanocarbon in its as-produced state is often very bulky, with the product occupying a large volume to mass ratio. It is frequently desirable to reduce this bulk for several reasons including ease of handling, shipping and packaging as well as reduction of the propensity of the tiny fibers to become airborne.

Typically, filamentary nanocarbon is tightly tangled and very often must be disentangled to satisfactorily impart the desired properties to the materials and devices incorporating it. For example, a tangled mass of filamentary nanocarbon, when combined with an insulating polymer, will not conduct electricity as well as the same amount of filamentary nanocarbon that is well dispersed. Additionally dispersion of single wall nanotube ropes is necessary to separate them by type (i.e., semiconducting vs. metallic). The prior art processes which are used to disperse or disentangle the filamentary nanocarbon disadvantageously break the fibers into shorter lengths. This can have the effect of reducing the electrical and thermal conductivities and the structural reinforcement efficacy of the product produced.

In addition to the fiber tangling problem described above, most filamentary nanocarbon materials produced contain metal catalyst. They also may contain polyaromatic hydrocarbons, soot, and non-filamentary carbon particles all of which are desirably removed in order to leave only the nanofibers for end product use.

The surface of an as-produced carbon nanotube or nanofiber may not be compatible with a given polymer, i.e., it may not wet or adhere well. This leads to difficulty in dispersing the product in a matrix (e.g., a thermoplastic or thermoset resin), as well as to poor overall mechanical properties in filled polymers or composites due to facile matrix/filler (reinforcement) debonding. The currently established methods for filamentary nanocarbon surface treatments to render them compatible for dispersion into a polymer include acid treatments, partial gas oxidation and electrochemical reaction. Acid and electrochemical treatments are intrinsically liquid processes, either aqueous or non-aqueous.

Pre-impregnation (or prepregging) is a technique of coating or infiltrating a fiber bundle or mat with a polymer before making the final article. For discontinuous materials (e.g., fillers) this can be thought of as masterbatching or dispersion into a polymer. Once prepregged, the material can be blended with additional material or formed directly into the desired shape or infiltrated into a conventional (non-nano) fiber architecture (e.g., mat, weave cross-ply, tow, etc.). Pre-impregnation is desirable because of the greater control and ease of dispersion and the reduction of aerosolized fiber during manufacturing.

The prior art methods for nanofiber purification, debulking, surface treatment, and dispersion frequently utilize liquids such as water, acids and alcohols which must be removed after treatment. This is a costly and time consuming step because the fibers must be dried before future use, which takes a great deal of time because the fibers have a high relative surface area.

A need exists therefore for an improved method for processing filamentary nanocarbon for purification, debulking, surface treatment, polymer pre-impregnation, and dispersion. Such a method would provide effective nanofiber processing, utilize commonly available apparatuses and equipment, and provide reduced processing costs.

SUMMARY OF THE INVENTION

Accordingly, it is a primary object of the present invention to provide an improved method for processing filamentary nanocarbon for debulking, dispersing, purifying, surface treating, pre-impregnating, and micronizing overcoming the limitations and disadvantages of the prior art.

Another object of the present invention is to provide a method of processing filamentary nanocarbon using commonly available apparatuses and equipment.

Yet another object of the present invention is to provide a method of processing filamentary nanocarbon exhibiting dramatically reduced processing times.

It is yet another object of the present invention to provide a method of processing filamentary nanocarbon avoiding wet processing and the attendant surface tension, drying time, energy and waste problems of the methods of the prior art.

It is still another object of the present invention to provide a method of processing filamentary nanocarbon producing longer, better dispersed filamentary nanocarbon than can be obtained by the methods of the prior art.

It is yet another object of the present invention to provide a method of processing filamentary nanocarbon producing improved surfaces for easier dispersion into liquids and polymers and for stronger bonds to matrix materials.

It is yet another object of the present invention to provide a method of dispersing or prepregging the nanofiber into suitable polymers, including epoxies, Elastomers, preceramic polymers, etc. which is easier and more effective at achieving good dispersion.

It is yet another object of the present invention to provide nanofibers in a form that is more easily handled, safer, and more cost-effective to ship.

It is yet another object of the present invention to provide a form of nanofilaments predispersed, such that subsequent processing (molding, blending, etc.) is easier and cost-effective.

These and other objects of the invention will become apparent as the description of the representative embodiments proceeds.

In accordance with the foregoing principles and objects of the invention, a post-manufacture processing method for debulking, dispersing, purifying, surface treating, pre-impregnating, and micronizing filamentary nanocarbon is described.

The method of the present invention utilizes high pressure, near-supercritical $CO_2$ within a pressure vessel to process the filamentary nanocarbon. The term near-supercritical is meant herein to encompass conditions near the supercritical point as well as above the supercritical point ($T_C$, $P_C$). This includes the high pressure liquid and gaseous states. In accordance with the invention, a quantity of filamentary nanocarbon is introduced into a pressure vessel. Near-supercritical $CO_2$ is then introduced into the pressure vessel. Processes such as debulking, dispersing, purifying, surface treating, pre-impregnating and micronizing can then be performed upon the filamentary nanocarbon within the pressure vessel. For example, if the mixture of $CO_2$ and filamentary nanocarbon is agitated within the pressure vessel, de-agglomeration and disentangling of the filamentary nanocarbon is achieved. When the $CO_2$ is released from the pressure vessel, the filamentary nanocarbon collected exhibits a dramatic reduction in volume. Other nanofiber processes can be performed such as surface treating and pre-impregnation by introduction of the desirable species into the near-supercritical $CO_2$ prior to processing. Purification processing can additionally be performed by introducing a co-solvent into the near-supercritical $CO_2$.

A significant advantage of the present invention lies in the fact that the processed nanofibers are dry upon removal from the pressure vessel. This is because $CO_2$ will evaporate immediately upon exposure to ambient pressure. The prior art methods of processing filamentary nanocarbon rely on the use of liquids such as water, alcohols and the like, requiring a lengthy fiber drying time. This drying step is entirely unnecessary according to the teachings of the present invention and the filamentary nanocarbon thus processed is ready for further processing immediately. The method of the present invention utilizes known, commonly available techniques, apparatuses and equipment, simplifying its implementation and use. Additionally, $CO_2$ is considered environmentally inert and use of the method of the present invention produces no waste concerns.

BRIEF DESCRIPTION OF THE DRAWING

The accompanying drawing incorporated in and forming a part of the specification, illustrates several aspects of the present invention and together with the description serves to explain the principles of the invention. In the drawing:

The drawing is a generic phase diagram illustrating the effect of pressure and temperature upon the physical state of a substance.

DETAILED DESCRIPTION OF THE INVENTION

In accordance with the present invention, a method of post-manufacture processing of filamentary nanocarbon for debulking, dispersing, purifying, surface treating, pre-impregnating, and micronizing the nanofibers is described. As used herein, the term filamentary nanocarbon is understood to encompass carbon nanotubes, both single and multiwall, as well as carbon nanofibers all having diameters less than a micrometer. The method of the present invention provides satisfactory results with either nanotubes or nanofibers, and for the purpose of description, the terms are used interchangeably.

Filamentary nanocarbon, in its as-produced state, is bulky, having a large volume to mass ratio. Additionally, filamentary nanocarbon is tangled and oftentimes must first be disentangled prior to use in order to satisfactorily impart the desired properties to the materials and devices incorporating it. The prior art methods for nanofiber debulking, dispersing, purifying, surface treating, pre-impregnating, and micronizing utilize liquids such as water, acids and alcohols which must be removed after treatment. This is a costly and time consuming step because the fibers must be dried before future use, which takes a great deal of time since the fibers have a high relative surface area.

Advantageously, and as will be described in more detail below, the method of the present invention utilizes high pressure, near-supercritical $CO_2$ in order to process the filamentary nanocarbon. Reference is made to the drawing, a generic phase diagram illustrating the effect of pressure and temperature upon the physical state of a substance. As can be seen, the supercritical region lies beyond the critical point ($T_C$, $P_C$), the point wherein the substance exists simultaneously as a gas and a liquid. Within the supercritical range, the phase or property of the substance varies between liquid and gas. Advantageously, a supercritical fluid exhibits no meniscus, thus exhibiting maximum surface wetting capability. Additionally, a supercritical fluid can infiltrate pores like a gas yet, at the same time, maintain the liquid's ability to dissolve substances that are soluble in the compound, unlike a gas. It is an advantage that the method of the present invention is also effectively utilized with near-supercritical $CO_2$, understood herein to encompass conditions near the supercritical point as well as above the supercritical point ($T_C$, $P_C$).

According to the method of the present invention, a quantity of nanofibers to be processed are introduced into a pressure vessel. Near-supercritical $CO_2$ is then introduced into the pressure vessel and is utilized to effect the desired process upon the filamentary nanocarbon. For example, a quantity of filamentary nanocarbon can be effectively debulked, de-agglomerated and disentangled by agitating the mixture within the pressure vessel. The $CO_2$ is then released from the pressure vessel and the filamentary nanocarbon is collected during the release. The filamentary nanocarbon thus collected exhibits a dramatic reduction in volume. Advantageously, other nanofiber processes can be performed such as surface treating and pre-impregnation by introduction of the desirable species into the near-supercritical $CO_2$. This can be rather simply accomplished by adding the desired species into the pressure vessel prior to further processing. Purification processing can additionally be performed by introducing a co-solvent into the near-supercritical $CO_2$. Of course, the above processing steps can be performed sequentially or even in combination in order to effect a number of processes on the filamentary nanocarbon.

An example of a commercially available apparatus that can be adapted to achieve the goals of the invention is the Cool Clean 55 commercial "Green" dry cleaning product available from Cool Clean Technologies, Inc., Burnsville, Minn. 55306. This apparatus has the ability to recapture and reuse $CO_2$ and achieves agitation through a rotating drum in which the product is placed. Other agitation aids, such as large ceramic balls could be added to the filamentary nanocarbon to enhance the agitation action.

Another example of a commercially available product suitable for use in performing the method of the present invention is the RESS50 available from Thar Instruments, Pittsburgh, Pa. 15238. This apparatus can be used for small particle formation by the technique of rapid expansion of supercritical solutions. In this case, the apparatus would be modified to produce small particles from a supercritical suspension, rather that a solution. It is known that there is no easy way to produce micron size powders of thermally unstable materials. Current processes involve mechanical grinding that often produce enough heat to convert these products into a paste.

Advantageously, dissolving the material in supercritical fluids and then spraying it through a nozzle eliminates this problem. Typically, non-polar materials can be dissolved in supercritical carbon dioxide and sprayed, as in spray drying. By manipulating the pressure, temperature and concentration, the user can manipulate powder sizes. This technique is called RESS, and its applications include pharmaceutical materials such as steroids.

A significant advantage of the present invention lies in the fact that the processed nanofibers are dry upon removal from the pressure vessel because $CO_2$ evaporates immediately upon exposure to ambient pressure. As stated above, the prior art methods of processing filamentary nanocarbon rely on the use of liquids, requiring a lengthy fiber drying time. This drying step of the prior art is entirely unnecessary according to the teachings of the present invention. Advantageously, the filamentary nanocarbon thus produced is ready for further processing or product incorporation immediately. Sometimes it may be necessary to remove the catalyst, PAH, co-solvents, etc. from the nanofibers. This can be conveniently accomplished if necessary by a purge using clean $CO_2$.

As stated, the method of the present invention can be modified to effect a wide variety of results rather simply. For example, if the mixture of $CO_2$ and filamentary nanocarbon is stirred within the pressure vessel, de-agglomeration and disentangling of the filamentary nanocarbon is achieved. The prior art processes which are used to disperse or disentangle filamentary nanocarbon disadvantageously break the fibers into shorter lengths. This can have the effect of reducing the electrical and thermal conductivities of the product produced. The method of the present invention disentangles the filamentary nanocarbon with less breaking of the fibers into shorter lengths. Other means of mechanical agitation can also be used. Ultrasonic agitation can also be incorporated. Finally, jets of liquid or gas can be used.

Carbon dioxide is known to be a good solvent and the near-supercritical $CO_2$, as used in the method of the present invention, advantageously purifies the filamentary nanocarbon by the removal unwanted growth byproducts such as metal catalyst, polyaromatic hydrocarbons, and non-filamentary carbons, in the form of, for example, soot, carbon black or spheroidal carbon shells. Co-solvents such as alcohol and N-methyl-pyrrolidone (NMP) can be used, in addition to surfactants.

Other desirable results can be achieved by the method of the present invention as well. For example, pre-impregnation; the introduction of a desirable species such as a polymer into the nanofibers can readily be effected by mixing or solvating the polymer into the near-supercritical $CO_2$. Also, in-situ polymerization can be done in the same fashion by adding monomers to the near-supercritical $CO_2$.

Advantageously, the polymer will infiltrate filamentary nanocarbon bundles and agglomerates better than the known techniques, especially in the case of single wall nanotube bundles or ropes, which are particularly difficult to disperse and impregnate with liquids or polymers. Suitable polymers include epoxies, imides, elastomers, thermoplastics, carbon precursors (polyacrylonitrile (PAN), phenolic resins, pitch, coal extracts, preceramic polymers, and organometallics.

Additionally, surface treatment of filamentary nanocarbon can be achieved according to the method of the present invention. Near-supercritical $CO_2$ naturally has some acidic properties, and can render filamentary nanocarbon surfaces more compatible without further steps. However, other surface functional groups can be added (functionalization) by dissolving precursors or functional groups into the near-supercritical $CO_2$. Examples would be amine groups, epoxides, hydroxyl, and carboxylic acid groups. These surface treatments transform the filamentary nanocarbon surface to one more compatible with future dispersion. They also can improve the bond strength between the filamentary nanocarbon and a matrix resin or polymer.

Advantageously, the method of the present invention utilizes known, commonly available techniques, apparatuses and equipment, simplifying its implementation and use. Additionally, $CO_2$ is considered environmentally inert and use of the method of the present invention produces minimal waste concerns.

In summary, numerous benefits have been described from utilizing the principles of the present invention. The present invention provides an improved method for processing filamentary nanocarbon for debulking, dispersing, purifying, surface treating, pre-impregnating, and micronizing overcoming the limitations and disadvantages of the prior art. The method of the present invention uses commonly available apparatuses and equipment, provides dramatically reduced processing times and avoids wet processing and the attendant surface tension, drying time, energy and waste problems of the methods of the prior art.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

The invention claimed is:

1. A method of processing filamentary nanocarbon, comprising the steps of:
   providing a quantity of entangled filamentary nanocarbon;
   providing a supply of high pressure, near-supercritical $CO_2$;
   providing a pressure vessel;
   installing said quantity of entangled filamentary nanocarbon into said pressure vessel;
   introducing said near-supercritical $CO_2$ into said pressure vessel and onto said quantity of entangled filamentary nanocarbon such that said quantity of entangled filamentary nanocarbon becomes a quantity of disentangled filamentary nanocarbon; and,
   collecting said quantity of disentangled filamentary nanocarbon from said pressure vessel.

2. The method of claim 1 wherein said collecting step is preceded by the step of agitating said near-supercritical $CO_2$ and said quantity of entangled filamentary nanocarbon.

3. The method of claim 1 wherein said installing step is preceded by the step of adding a quantity of surfactant into said pressure vessel.

4. The method of claim 1 wherein said installing step is preceded by the step of adding a quantity of acid into said pressure vessel.

5. The method of claim 1 wherein said near-supercritical $CO_2$ includes an acid sufficient for metal catalyst removal.

6. The method of claim 1 wherein said installing step is preceded by the step of adding a quantity of co-solvent into said pressure vessel.

7. The method of claim 1 wherein said installing step is preceded by the step of adding a quantity of polymer to be pre-impregnated into said quantity of entangled filamentary nanocarbon into said pressure vessel.

8. A method of processing filamentary nanocarbon, comprising the steps of:
providing a quantity of entangled filamentary nanocarbon;
providing a supply of high pressure, near-supercritical $CO_2$;
providing a pressure vessel;
installing said quantity of entangled filamentary nanocarbon into said pressure vessel;
introducing said near-supercritical $CO_2$ into said pressure vessel and onto said quantity of entangled filamentary nanocarbon such that said quantity of entangled filamentary nanocarbon becomes a quantity of disentangled filamentary nanocarbon; and,
releasing said near-supercritical $CO_2$ and said quantity of disentangled filamentary nanocarbon from said pressure vessel by spraying through a nozzle.

9. The method of claim 8 wherein said releasing step is preceded by the step of agitating said near-supercritical $CO_2$ and said quantity of entangled filamentary nanocarbon.

10. The method of claim 8 wherein said installing step is preceded by the step of adding a quantity of surfactant into said pressure vessel.

11. The method of claim 8 wherein said installing step is preceded by the step of adding a quantity of acid into said pressure vessel.

12. The method of claim 8 wherein said near-supercritical $CO_2$ includes an acid sufficient for metal catalyst removal.

13. The method of claim 8 wherein said installing step is preceded by the step of adding a quantity of co-solvent into said pressure vessel.

14. The method of claim 8 wherein said installing step is preceded by the step of adding a quantity of polymer to be pre-impregnated into said quantity of entangled filamentary nanocarbon into said pressure vessel.

* * * * *